United States Patent Office 3,024,801
Patented Mar. 13, 1962

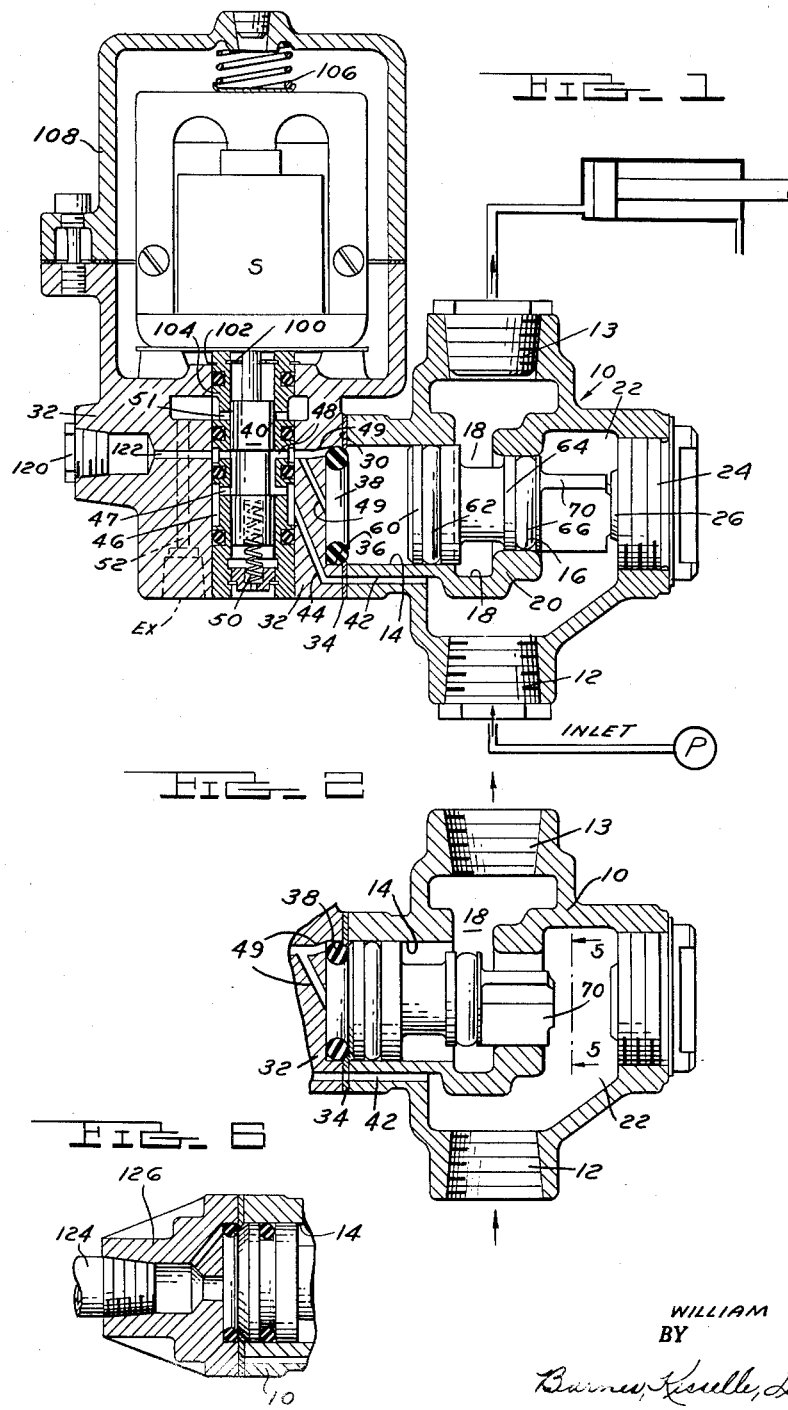

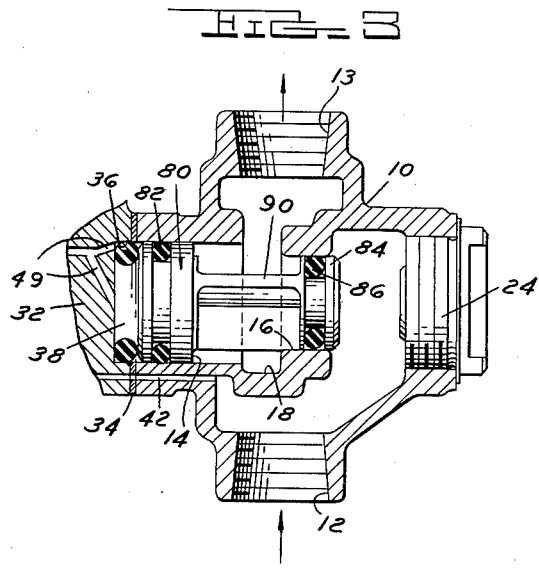
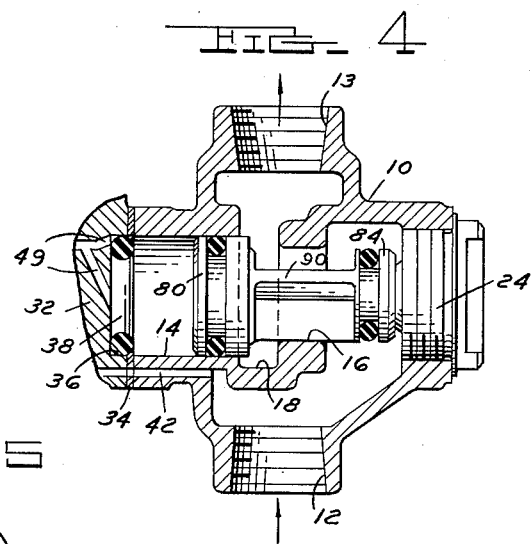
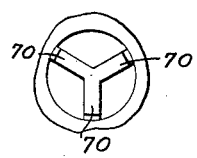

3,024,801
COMBINATION VALVE AND HOUSING
William Carls, Milford, Mich.
(Highland, Mich.)
Filed Feb. 7, 1955, Ser. No. 486,334
1 Claim. (Cl. 137—27)

This invention relates to a combination of valve and housing and is particularly directed to the design of a straight-way valve which is adaptable to normally closed or normally open positions and to a valve housing and poppet design which can be adapted to various positions by a simple change of poppet.

In the past it has been common to require complete change of valve housing and valve member design to obtain different results in the operation of the valve. The present invention contemplates a combination of a single valve housing with two different types of poppets which will provide either a normally open or a normally closed straight-way valve.

Various other objects and features of the invention will be apparent in the following description and claim.

Drawings accompany the disclosure, and the various views thereof may be briefly described as:

FIGURE 1, a sectional view of the valve housing illustrating a solenoid valve control and a normally open straight-way valve poppet in closed position.

FIGURE 2, the valve housing with the valve poppet in open position.

FIGURE 3, the same valve housing with a normally closed straight-way valve poppet in closed position.

FIGURE 4, a similar view to FIGURE 3 showing the poppet in open position.

FIGURE 5, an end view of the poppet on line 5—5 of FIGURE 2.

FIGURE 6, a view of a supplemental adapter housing.

Referring to the drawings, a basic valve housing 10 is shown having a pressure inlet 12 and a control outlet 13. A stepped central bore is provided in the housing having an enlarged cylindrical section 14 and a smaller cylindrical section 16 co-axial therewith, said sections being separated by a port recess 18 which leads to the outlet port 14. The inlet port 12 lies outside a wall 20 surrounding port 18 and bore 16 and extends to the right as shown in FIGURE 1 to a recess 22 which is at the end of the bore 16.

A screw plug 24 at the end of recess 22 serves as a closure for the valve housing at that end and also as a stop for a valve poppet to be later described, the plug having a small central extension 26 on the inner end. The bore 14 opens at the other end of the valve at a contact surface 30 which is held in place against a control valve housing 32 by suitable bolts, not shown.

A gasket 34 seals the surfaces between the valve housings. The housing 32 is recessed at 36 to receive a bumper ring 38 which cushions the poppet motion at that end of the bore. The housing 32 has a control valve 40 which directs supply air from inlet 12 to passages 42 and 44 leading to a control port 46—47 which, through valve 40, leads to a port 48 and passages 49 extending to the recess 36 opening to bore 14. One passage 49 leads to the outside of ring 38 so that the entire surface of the piston will be exposed to pressure.

With the valve 40 in the down position shown in FIGURE 1, the solenoid S is energized and air from the supply port 46 is directed past the valve to the bore 14. When the solenoid S mounted above the housing 32 is de-energized, the spring 50 moves valve 40 upwardly and port 46 is closed from port 48. This movement, however, shifts valve 40 so port 48 is connected to port 51 leading to an atmospheric passage 52.

In FIGURES 1 and 2 a double land poppet is shown having an enlarged land 60 slidably movable in bore 14 and having an O-ring seal 62. A smaller land 64 having an O-ring 66 operates in bore 16. The end of the valve beyond the land 64 consists of a webbed portion having three radial sides 70, this portion having a radial dimension such that the edges of the web portion 70 will have a sliding fit in bore 16. With the valve parts in the position as shown in FIGURE 1 with the solenoid S energized, pressure is bearing on the large end 60 of the poppet valve through port 48 and passages 49. Pressure is also bearing against the webbed end of the valve through the inlet 12. However, since the end 60 has a larger area, the poppet is shifted to the right against the stop plug 24.

If the solenoid is de-energized, valve 40 will be shifted upwardly by spring 50 to close port 46—47, and this shifting will also connect the narrowed portion of the valve 40 to ports 48 and 51, which connect to the atmospheric port 52. With this arrangement, pressure on the right-hand end of the poppet will shift it to the left, as viewed in FIGURE 2, so that pressure may pass the webs 70 from inlet 12 and port 22 to the outlet ports 18 and 13.

In FIGURES 3 and 4, the same housing 10 is shown, this time with a new type of poppet having an enlarged land 80 with a sealing O-ring 82 and a smaller land 84 with a sealing O-ring 86 operating in and out of bore 16. Between the lands 80 and 84 is a webbed connecting portion 90 having a configuration similar to the ends 70 of the poppet of FIGURE 1 (see section view in FIGURE 5). These webbed portions 90 have a sliding relationship with the bore 16.

As viewed in FIGURE 3, the valve is in a closed position with the solenoid de-energized; and as viewed in FIGURE 4, the valve is in an open position with the solenoid energized.

There is thus disclosed a single housing valve unit with two types of valve poppets of extremely simple construction which serve to provide a multiplicity of functions. The single casting housing has an inlet and an outlet port on opposite sides separated by walls which form a central bore, the inlet and outlet being open to each other only through said bore. With one type of poppet, FIGURE 2, the valve is normally open with a solenoid control de-energized. With the other type of poppet, FIGURE 3, the valve is normally closed with the solenoid port de-energized.

It will be noted that two snap rings 100 and 102 locate the valve sleeve 104 and the valve 40 respectively. The solenoid assembly is held in place by a spring 106 located on cover 108, which is held down by lock bolts, only one of which is shown. Thus, the entire assembly is released when the cover is loosened.

The valve control assembly can be tandemed by removing plug 120 at the end of passage 122 leading to port 48. A pipe 124 may connect from passage 122 directly to another valve housing with a suitable adapter housing 126 (FIGURE 6) so that a single solenoid control can operate a number of poppets.

I claim:

A differential action air valve assembly and control for use with a single source of air supply which comprises a main valve housing to be associated with an air supply source, a control housing and means therein associated with said main housing to direct control air to said main housing, said main housing having a first open cylindrical bore at one end abutting and open to said control housing, a concentric co-axial smaller bore open to and spaced from said open bore, independent inlet and outlet passages leading to opposite ends of said smaller bore within said housing, the combination with said housing of a pair of valve members selectively operable in said housing to provide a normally closed air passage therethrough and a normally open air passage therethrough, each valve member comprising a valve to open and close said smaller bore and connect and disconnect said inlet and outlet passages, and comprising a single two-land poppet shiftable to two positions in said bores having an enlarged and slidably fitted and operable in said main bore and a small end slidably fitted and movable into and out of the smaller bore, means on the first of said valves aligned with said small end on the side of said small end opposite the large end to guide the poppet in a substantial portion of its movement in said smaller bore and to permit the passage of air through said smaller bore while positioned therein, and means on the other of said valve members between said lands slidably fitted and movable into and out of the smaller bore to guide the poppet in a substantial portion of its movement in said smaller bore and to permit the passage of air through said smaller bore when positioned thereon, whereby when one of said passages is supplied with air under pressure the poppet valve in said bore will be exposed to pressure on each end and pneumatically biased to one of its two positions.

References Cited in the file of this patent

UNITED STATES PATENTS

| | | |
|---|---|---|
| 235,748 | Crisp | Dec. 21, 1880 |
| 912,384 | Kimball | Feb. 16, 1909 |
| 1,111,903 | James | Sept. 29, 1914 |
| 2,208,820 | Tarris | July 23, 1940 |
| 2,505,195 | Majneri | Apr. 25, 1950 |
| 2,621,885 | Schmitt | Dec. 16, 1952 |
| 2,624,542 | Ghormley | Jan. 6, 1953 |
| 2,692,614 | McLeod | Oct. 26, 1954 |
| 2,759,488 | Garrett | Aug. 21, 1956 |

FOREIGN PATENTS

| | | |
|---|---|---|
| 1,065,094 | France | Dec. 30, 1953 |